United States Patent Office 3,079,386
Patented Feb. 26, 1963

3,079,386
12-CARBOXYETHYL-12-HYDROXYPREGN-4-ENE-3,20-DIONE LACTONE AND INTERMEDIATES
Stephen Kraychy, Northbrook, Ill., assignor to G. D. Searle & Co., Chicago, Ill., a corporation of Delaware
No Drawing. Filed July 28, 1960, Ser. No. 45,791
5 Claims. (Cl. 260—239.57)

This invention relates to 12-carboxyethyl-12-hydroxypregn-4-ene-3,20-dione lactones, intermediates thereto, and processes for the manufacture theerof. More particularly, this invention relates to chemical compounds of the formula

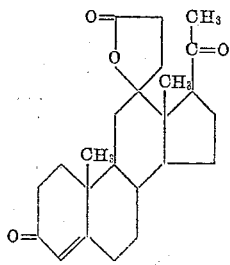

and means whereby a compound of the formula set forth can be obtained. In the formula as drawn, it will be noted that the configuration of the lactone ring members attaching to carbon atom 12 in the steroid nucleus is not specified; but the preferred embodiment of the invention represented is the product of Example 7B, having a melting point of 231–234° and a specific rotation of approximately +166.3°. It appears—although this has not been conclusively established—that the product of Example 7B is the 12α-carboxyethyl-12β-hydroxy lactone, and it will accordingly be arbitrarily so designated hereinafter. The configuration of 12-substituents in intermediates leading to the preferred product likewise is arbitrarily assigned herein.

Equivalent to the lactonized products hereof for the purposes of this invention are corresponding hydroxy acids and their salts, of the formula

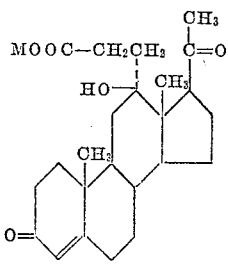

wherein the steric considerations are the same as for the lactones and M represents hydrogen, an alkali metal, or the ammonium radical. Likewise equivalent are the alkaline earth salts of the foregoing hydroxy acids.

The products of this invention are useful by reason of their valuable pharmacological properties. Especially, they are prized for their selective capacity to block the effect of desoxycorticosterone acetate on urinary sodium and potassium.

Manufacture of the preferred 12-carboxyethyl-12-hydroxypregn-4-ene-3,20-dione lactone hereof proceeds by a series of reactions starting with a 5β-pregnane-3α,12α,20 (either α or β)-triol, which is obtained from 3α,12α-dihydroxypregnan-20-one by sodium borohydride reduction. The 3 and 20 hydroxyls of the triol are protected by esterification (for example, with succinic anhydride in pyridine), whereupon the 12-hydroxyl is oxidized with chromium trioxide and sulfuric acid in a ketonic medium, and the protective ester groups then cleaved with alcoholic alkali. Either of the 3α,20(α and β)-dihydroxy-5β-pregnan-12-ones thus obtained is mixed with acetylene and potassium hydroxide in a glycol ether to give the 12α-ethynyl-12β-hydroxy derivative, which is carboxylated by seriatim treatment with a Grignard reagent and carbon dioxide in ethereal solvent to give the corresponding 12α - carboxyethynyl-12β-hydroxy compound. This, in turn, is reduced to 12α-(2-carboxyethyl)-5β-pregnane-3α, 12β,20(α or β)-triol γ-lactone with hydrogen catalyzed by palladium-on-charcoal, and the 3α and 20 hydroxyls are then oxidized to oxo substituents with chromium trioxide and sulfuric acid in ketonic medium. The resultant 12α - (2 - carboxyethyl)-12β-hydroxy-5β-pregnane-3,20-dione γ-lactone is 4β-brominated with bromine in dimethylformamide, using p-toluenesulfonic acid as catalyst; and, finally, dehydrobromination is effected with lithium chloride in dimethylformamide to give the desired 12α-(2-carboxyethyl)-12β - hydroxypregn-4-ene - 3,20-dione γ-lactone.

Those skilled in the art will recognize that the salts set forth as equivalent to the lactones hereof are manufactured by contacting the lactones with appropriate aqueous bases, for example, KOH, NaOH, NH$_4$OH, Ca(OH)$_2$, etc. The free acids, in turn, are produced from the salts by a critically brief exposure to a proton source. Prolongation of exposure time induces lactonization.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, relative amounts of materials are given in parts by weight, except as otherwise noted.

EXAMPLE 1

A. *5β-pregnane-3α,12α,20β-triol.*—To a solution of approximately 51 parts of 3α,12α-dihydroxy-5β-pregnan-20-one in 320 parts of methanol is slowly added, with agitation, approximately 6 parts of sodium borohydride dissolved in 16 parts of methanol. When the addition is complete, agitation is continued for 25 minutes, at which point 20 parts of acetic acid is mixed in to destroy excess reducing agent. The resultant solution is diluted with approximately 550 parts of water and then allowed to stand at 5° for 3 hours. The crystalline precipitate thrown down is 5β-pregnane-3α,12α,20β-triol which, filtered off and further purified by recrystallization from methanol, is obtained as thick plates melting at 238–240°. A 1% solution of the product in methanol is characterized by a specific rotation, at 26° and referred to the D line of sodium, of approximately +49.1°. The product has formula

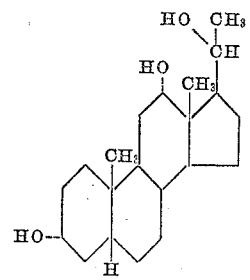

B. *5β-pregnane-3α,12α,20α-triol hemimethanolate.*—Further dilution (with water) of the reaction mixture mother liquor in part A of this example produces, at 5° on standing, a second crystalline precipitate which, isolated as before and recrystallized from methanol, melts at 225–227°. This material, obtained as thick plates, is 5β-pregnane-3α,12α,20α-triol hemimethanolate, which is further characterized, when dissolved q.s. 1% in methanol, by a specific rotation (at 26° and referred to the sodium D line) of approximately +55.2°. The product has the formula

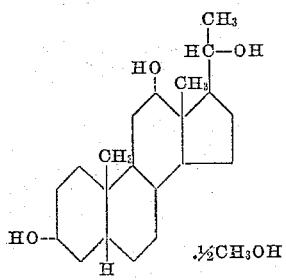

Solvent of crystallization is driven off by heating in vacuo.

EXAMPLE 2

A. *5β-pregnane-3α,12α,20β-triol 3,20-bishemisuccinate.*—A mixture of 1 part of 5β-pregnane-3α,12α,20β-triol, 20 parts of anhydrous pyridine, and 3 parts of succinic anhydride is heated at 90–100° in a nitrogen atmosphere for 4 hours. Volatile components are thereupon removed by vacuum distillation, and the residue is partitioned between chloroform and water. The chloroform phase is separated and washed successively with dilute hydrochloric acid and water. It is then dried over anhydrous sodium sulfate and stripped of solvent by vacuum distillation. The residue, crystallized from acetone, is obtained as colorless fine needles melting at 191–193°. This material is 5β-pregnane-3α,12α,20β-triol 3,20-bishemisuccinate.

B. *3α,20β-dihydroxy-5β-pregnan-12-one.*—To a solution of approximately 43 parts of 5β-pregnane-3α,12α,20β-triol 3,20-bishemisuccinate in 1145 parts of acetone at room temperatures is slowly added, with agitation, 30 parts of water in which are dissolved 6 parts of chromium trioxide and 7 parts of concentrated sulfuric acid. After 5 minutes, 7145 parts of water is introduced and the resultant mixture is extracted with ether. The ether extract is dried over anhydrous sodium sulfate and then stripped of solvent by distillation. The nearly colorless oil thus obtained is heated with 145 parts of aqueous 45% potassium hydroxide and 570 parts of methanol at the boiling point under reflux for 4 hours. The yellow solution which results is diluted with water to the point of incipient turbidity and then let stand at 0° for 1 hour. The solid precipitate thrown down is collected on a filter and washed thereon with water until the washings are neutral to litmus. Recrystallization from ethyl acetate affords colorless needles of 3α,20β-dihydroxy-5β-pregnane-12-one, melting at approximately 224.5–225.5°. The product has the formula

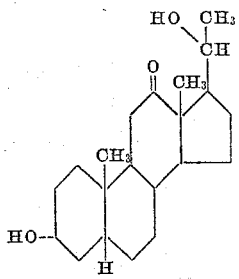

EXAMPLE 3

*12α-ethynyl-5β-pregnane-3α,12β,20β-triol monohydrate.*—To a solution of 660 parts of bis(2-methoxyethyl) ether and 40 parts of 2-(2-ethoxyethoxy)ethanol at 135° in a nitrogen atmosphere is added 137 parts of potassium hydroxide. The resulting solution is cooled to −10° during vigorous agitation. The finely dispersed suspension of potassium hydroxide so produced is saturated with acetylene passing rapidly over the surface of the suspension. There is then added a suspension of approximately 34 parts of 3α,20β-dihydroxy-5β-pregnan-12-one in 100 parts of bis(2-methoxyethyl) ether. The resulting mixture is maintained at temperatures ranging between 0° and −10° for 6½ hours while acetylene is passed slowly over the surface. Throughout the foregoing operations, vigorous agitation is continued. Next, the mixture is poured into 16,000 parts of cold water, and the mixture thus obtained is acidified with 205 parts of concentrated hydrochloric acid. A solid precipitate is thrown down. After standing in contact with the mother liquor overnight, it is filtered off and washed to neutrality with water. Recrystallization from aqueous methanol affords 12α-ethynyl-5β-pregnane-3α,12β,20β-triol monohydrate as fine needles, the melting point of which is approximately 230–231°. The produce has the formula

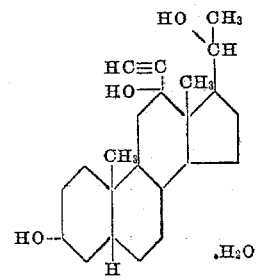

Water of crystallization is removed by prolonged heating in vacuo.

EXAMPLE 4

*12α-carboxyethynyl-5β-pregnane-3α,12β,20β-triol monohydrate.*—To a solution of 72 parts of methylmagnesium bromide in 140 parts of ether and 280 parts of tetrahydrofuran at the boiling point under reflux is slowly added, with agitation, 27 parts of 12α-ethynyl-5β-pregnane-3α,12β,20β-triol monohydrate dissolved in 420 parts of tetrahydrofuran. Agitation at the boiling point under reflux is continued overnight, whereupon the reactants are cooled to room temperature and a stream of carbon dioxide is then introduced during 15 hours with agitation. At this point, approximately 100 parts of water is cautiously stirred in; and the resultant mixture is acidified with concentrated hydrochloric acid. A further 2000 parts of water is then stirred in, and the mixture thus obtained is extracted with chloroform. The chloroform extract is extracted, in turn, with aqueous 10% potassium hydroxide. The potassium hydroxide extract is acidified with concentrated hydrochloric acid, and the resultant mixture is extracted with chloroform. Spontaneous precipitation occurs in this chloroform extract. The precipitate, filtered off and recrystallized from aqueous methanol, affords thick prisms of 12α-carboxyethynyl-5β-pregnane-3α,12β,20β-triol monohydrate, melting at 247°–253° with vigorous gas evolution. The product has the formula

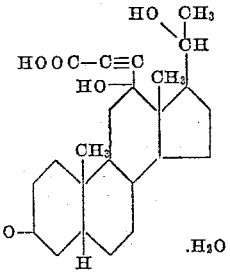

EXAMPLE 5

*12α-(2-carboxyethyl)-5β-pregnane-3α,12β,20β-triol γ-lactone.*—A solution of approximately 8 parts of 12α- carboxyethynyl - 5β - pregnane-3α,12β,20β-triol monohydrate in 200 parts of absolute ethanol is agitated at room temperatures in contact with hydrogen under 3 atmospheres pressure and in the presence of 1 part of 5% palladium-on-charcoal catalyst. When absorption of hydrogen ceases, the catalyst is filtered out; and the filtrate is stripped of solvent by vacuum distillation. The residue is taken up in chloroform, and the chloroform solution is washed with aqueous 10% potassium hydroxide and then with water. It is thereupon dried over anhydrous sodium sulfate and finally stripped of solvent by vacuum distillation. The residue is 12α-(2-carboxyethyl)-5β-pregnane-3α,12β,20β-triol γ-lactone which, recrystallized from ethanol, is obtained as thick prisms melting at 252.5–255°. The product has the formula

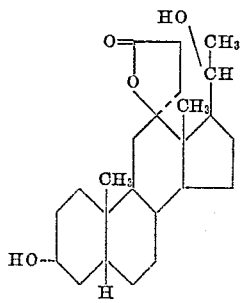

EXAMPLE 6

*12α-(2-carboxyethyl)-12β-hydroxy - 5β - pregnane-3,20-dione γ-lactone.*—To a solution of approximately 59 parts of 12α-(2-carboxyethyl) - 5β - pregnane - 3a,12β,20β-triol γ-lactone in 6400 parts of acetone at 15° is added, with agitation, approximately 115 parts of water in which are dissolved 23 parts of chromium trioxide and 27 parts of concentrated sulfuric acid. The resultant mixture is maintained at 15° with agitation for approximately 15 minutes, at the end of which time excess oxidizing agent is destroyed by incorporating 40 parts of 2-propanol. Several volumes of water is then introduced, and the mixture so produced is extracted with ether. The ether extract is washed with water, dried over anhydrous sodium sulfate, and stripped of solvent by distillation. The residual white solid, recrystallized from ethyl acetate, affords needles melting at 251–253°. This material is 12α-(2-carboxyethyl)-12β-hydroxy-5β-pregnane-3,20-dione γ-lactone, of the formula

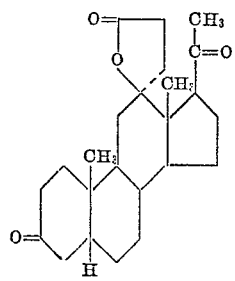

EXAMPLE 7

A. *4β-bromo-12α-(2-carboxyethyl) - 12β - hydroxy-5β-pregnane-3,20-dione γ-lactone.*—To a solution of 295 parts of 12α-(2-carboxyethyl)-12β-hydroxy-5β-pregnane-3,20-dione γ-lactone and 6 parts of p-toluenesulfonic acid monohydrate in 4200 parts of dimethylformamide is added, with agitation during 7 hours at room temperatures, 123 parts of bromine dissolved in 1000 parts of dimethylformamide. When the addition is complete, agitation is continued for ½ hour, at which point the nearly colorless reaction mixture is poured into 40,000 parts of water. A white solid precipitates, which is collected on a filter, washed thereon with water, and dried in vacuo with concentrated sulfuric acid overnight. The resultant material is 4β-bromo-12α-(2-carboxyethyl)-12β-hydroxy-5β-pregnane-3,20-dione γ-lactone, which melts at 114–122°.

B. *12α-(2-carboxyethyl)-12β-hydroxypregn-4-ene-3,20-dione γ-lactone.*—A mixture of 300 parts of 4β-bromo-12α-(2-carboxyethyl)-12β-hydroxy-5β - pregnane - 3,20-dione γ-lactone, 83 parts of lithium chloride, and 3000 parts of dimethylformamide is heated at approximately 90° in a nitrogen atmosphere for 2¼ hours. The resulting yellow solution is slowly diluted with approximately 10 volumes of water, and the mixture thus obtained is let stand at room temperature for ½ hour. The crystalline product thrown down is filtered off, washed on the filter with water, and dried in air. Recrystallization from ethanol affords colorless needles of 12α-(2-carboxyethyl)-12β-hydroxypregn-4-ene-3,20-dione γ-lactone, melting at 231–234°. A 1% solution in chloroform is characterized by a specific rotation, referred to the D line of sodium, of approximately +166.3°. The product has the formula

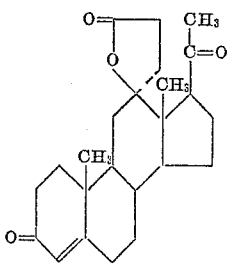

EXAMPLE 8

*3α,20α-dihydroxy-5β-pregnan-12-one.*—A mixture of 17 parts of 5β-pregnane-3α,12α,20α-triol hemimethanolate, 150 parts of pyridine, and 25 parts of succinic anhydride is heated at approximately 95° in a nitrogen atmosphere for 4 hours. Volatile components are removed by vacuum distillation, and the residue is partitioned between chloroform and water. The chloroform phase is separated and successively washed with dilute hydrochloric acid and water. Upon distillation of solvent, an oil, resistant to crystallization, is obtained. This oil, which is 5β-pregnane-3α,12α,20α-triol 3,20-bishemisuccinate, is taken up in 400 parts of acetone, to which solution at room temperatures is slowly added with agitation, 18 parts of water in which is dissolved approximately 4 parts of chromium trioxide and a like amount of concentrated sulfuric acid. After 10 minutes, excess oxidizing agent is destroyed by incorporation of 2-propanol; and precipitated solids are then removed by filtration. The filtrate is stripped of solvent by vacuum distillation and the residue is heated with 80 parts of aqueous 45% potassium hydroxide, 50 parts of water, and 400 parts of methanol at the boiling point under reflux in an atmosphere of nitrogen for 4 hours. A white precipitate appears at the outset of the heating period and persists throughout. At the conclusion of the prescribed boiling time, the mixture is cooled, diluted with 1500 parts of water, and let stand for 1 hour at room temperatures. The precipitate which forms is collected on a filter, washed thereon with water, and dried in air. This material is the desired 3α,20α-dihydroxy-5β-pregnan-12-one which, recrystallized from acetic acid, is obtained as a colorless solid melting at 264–266°. The product has the formula

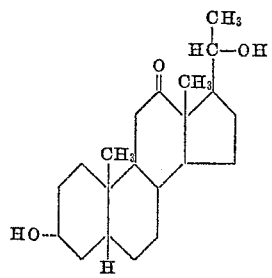

What is claimed is:
1. A compound of the formula
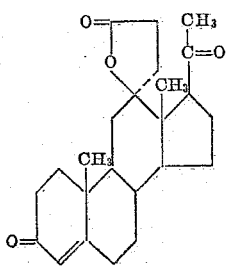
2. 12α-ethynyl-5β-pregnane-3α,12β,20-triol.
3. 12α-carboxyethynyl-5β-pregnane-3α,12β,20-triol.
4. 12α-(2-carboxyethyl)-5β-pregnane-3α,12β,20 - triol γ-lactone.
5. 12α-(2-carboxyethyl)-12β - hydroxy - 5β - pregnan-3,20-dione γ-lactone.
References Cited in the file of this patent
UNITED STATES PATENTS
2,940,991    Julian et al. _____ June 14, 1960
OTHER REFERENCES
Engel et al.: Canadian J. of Chem., vol. 37, pages 2031–41 (1959); page 2033 relied on.